United States Patent [19]

Morishita

[11] Patent Number: 4,677,468
[45] Date of Patent: Jun. 30, 1987

[54] STEREOSCOPIC TELEVISION IMAGE-PICKUP DEVICE DISPLAY DEVICE

[75] Inventor: Masanobu Morishita, Osaka, Japan

[73] Assignee: NEC Home Electronics Ltd., Japan

[21] Appl. No.: 765,210

[22] Filed: Aug. 13, 1985

[30] Foreign Application Priority Data

Aug. 13, 1984 [JP] Japan .............................. 59-169077
Aug. 13, 1984 [JP] Japan .............................. 59-169078

[51] Int. Cl.⁴ ...................... H04N 5/238; H04N 13/00
[52] U.S. Cl. ........................................ 358/88; 358/91; 358/228
[58] Field of Search ...................... 358/88, 91, 92, 228

[56] References Cited

U.S. PATENT DOCUMENTS

| | | | |
|---|---|---|---|
| 4,264,926 | 4/1981 | Etra | 358/91 |
| 4,367,486 | 1/1983 | Eichenlaub | 358/88 |
| 4,562,463 | 12/1985 | Lipton | 358/88 |
| 4,567,513 | 1/1986 | Imsand | 358/92 |

Primary Examiner—Howard W. Britton
Attorney, Agent, or Firm—Gerald J. Ferguson, Jr.; Michael P. Hoffman; Ronni S. Malamud

[57] ABSTRACT

In a stereoscopic television display device, the timing of read out data of a frame memory for right eye and the timing of read out data of a frame memory for left eye are shifted with respect to each other other so that the observer can freely select a point other than a camera's observation point as his observation point. Furthermore, according to another aspect of the invention, a stereoscopic television image pickup device is provided in which an electrically controllable aperture and an optical transmission plate having an electrically controllable transmittance are disposed between an object and image pickup units for right eye bad left eye, and in each image pickup unit the aperture and the transmittance are controlled so that the video signal level and the degree of opening of the aperture are set to desired values.

7 Claims, 7 Drawing Figures

STEREOSCOPIC TELEVISION IMAGE-PICKUP DEVICE DISPLAY DEVICE

BACKGROUND OF THE INVENTION

This invention relates to an image pickup device and a display device for stereoscopic television.

Figure 1:
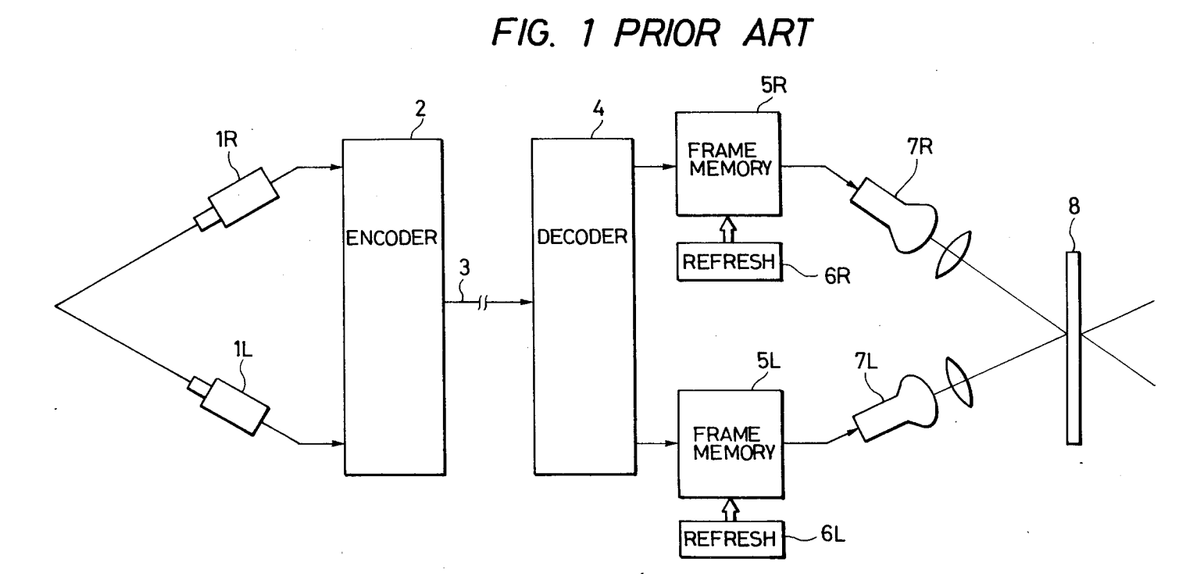
FIG. 1 is a block diagram of an illustrative, prior art stereoscopic television system.

In general, a stereoscopic television system is designed as shown in FIG. 1. On the image pickup side, two television cameras 1R and 1L disposed on both sides of an object form a video signal for right eye and a video signal for left eye (hereinafter referred to as "a right eye video signal" and "a left eye video signal", respectively, when applicable). These video signals are encoded by an encoder 2 into an encoded video signal which is applied to a transmission path 3. On the image reception side, the encoded video signal transmitted through the transmission path 3 is decoded into the right eye video signal and the left eye video signal.

The right eye video signal outputted by the decoder 4 is stored in a frame memory 5R. Similarly, the left eye video signal outputted by the decoder 4 is stored in a frame memory 5L. In response to addresses supplied from refresh counters 6R and 6L, the video signals stored in the frame memories 5R and 5L are simultaeously read and applied to a picture projecting tube 7R for right eye and a picture projecting tube 7L for left eye (hereinafter referred to as "a right eye picture projecting tube 7R" and "a left eye picture projecting tube 7L", respectively, when applicable). The right eye picture projecting tube 7R and the left eye picture projecting tube project the picture for right eye and the picture for left eye, respectively, onto a stereoscopic picture displaying screen 8, so that a person in front of the screen 8 can observe the stereoscopic picture.

The above-described stereoscopic television system handles the binocular sight similarly as in the eyesight of man. Therefore, the system suffers from a difficulty that the resultant picture appears unnatural because of a double-picture phenomenon.

Figure 2:
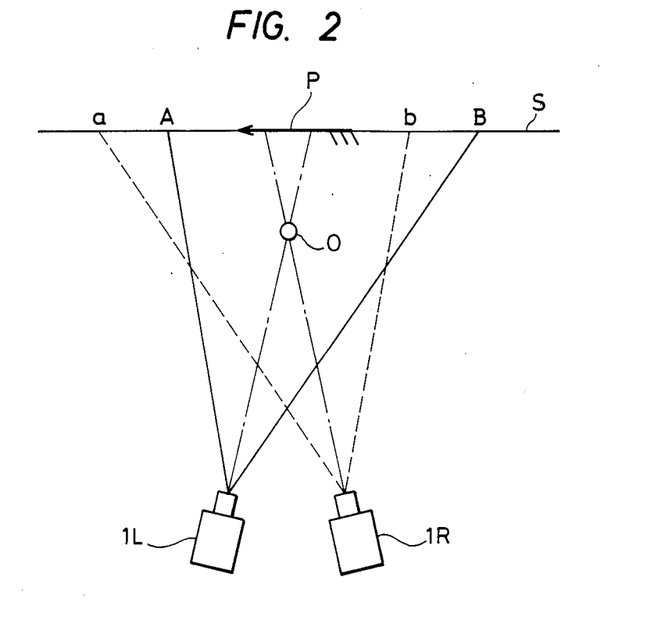
FIGS. 2 and 3 are diagrams which illustrate the difficulties accompanying the stereoscopic television system of FIG. 1.

The difficulty caused by the double-picture phenomenon will be described with reference to FIG. 2. FIG. 2 shows the image pickup side where a right eye camera IR for forming a right eye video signal and a left eye camera IL for forming a left eye video signal are used to photograph an object O. The object O is at the intersection of the optical axis of the right eye camera IR and the optical axis of the left eye camera 1L. Therefore, the object O is positioned not only at the center of the right eye picture formed by the right eye camera but also at the center of the left eye picture formed by the left eye camera. Accordingly, the object O can be observed as a clear stereoscopic picture on the image reception side. The above-described intersection of the two optical axes will be referred to as "a camera's observation point", when applicable.

It is assumed that, in FIG. 2, the cameras 1R and 1L have the fields of visions defined by the dotted lines and the solid lines, respectively, and there is a wall S behind the object O (the camera's observation point). In this case, a picture formed by the left eye camera 1L has the left end A and the right end B, while a picture formed by the right eye camera 1R has the left end a and the right end b. On the image reception side, the left ends A and a and the right ends B and b are displayed in such a manner that the left ends overlap each other and the right ends overlap each other. As a result, double images appear on the screen, and the resultant picture on the screen is unnatural. Observation of such a picture for a long time strains the eyes.

Figure 3:
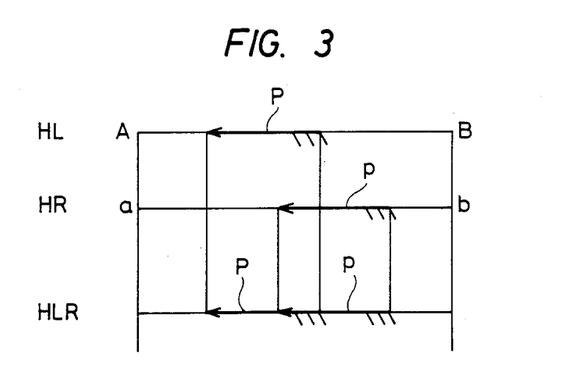

For instance, the image of an object point P on the wall S is shifted to the left from the center of the horizontal scanning line HL formed by the left eye camera 1L and to the right from the center of the horizontal scanning line HR formed by the right eye camera 1R, as shown in FIG. 3. Therefore, if the horizontal scanning lines formed by the right and left eye cameras are supplied to the picture projecting tubes on the image reception side so as to be observed simultaneously, then this is equivalent to the case where images are displayed with one horizontal scanning line, i.e., the resultant picture is unnatural because of the double images.

As is apparent from the above description, when an object is remoter from the cameras than the camera's observation point, the image of the object observed by the left eye camera is shifted to the left from its actual position, while the image of the object observed by the right eye camera is shifted to the right from its actual position. These images are referred to as "same-side double images". On the other hand, when an object is located between the camera's observation point and the cameras, the image of the object observed by the left eye camera is shifted to the right from its actual postion, while the image of the object observed by the right eye camera is shifted to the left from tis actual postion. These images are referred to as "different-side double images".

As is apparent from the above description, with the conventional stereoscopic television display device, an object located away from the camera's observation point form double images, which makes the resultant picture unnatural. This difficulty relates to the fact that an observer cannot freely select a point other than the camera's observation point as his own observation point.

It is assumed that FIG. 2 shows the case where a concert is being photographed, and the object O is a main performer while the object point P is an accompanist. The camera's observation point is placed on the main performer which is playing enthusiastically, while the stereoscopic image of the main performer is satisfactorily reproduced on the image reception side. At the same time, the accompanist behind the main performer is observed as double images. Therefore, observation of the resultant picture for a long time will strain the eyes.

In the stereoscopic television system in FIG. 1, one example of the stereoscopic picture displaying screen 8 is made up of a half-mirror which combines images projected by the picture projecting tubes. In this case, the observers wears special spectacles to observe stereoscopic images. The special spectalces allow the right eye to observe an image formed by the right eye video signal and the left eye to observe an image formed by the left eye video signal. In this case also, difficulties similar to those which have been described with reference to FIG. 1 are caused.

SUMMARY OF THE INVENTION

An object of this invention is to eliminate the above-described difficulties accompanying a conventional stereoscopic television system.

According to one aspect of the invention, a stereoscopic television display device is provided in which read timing varying means is provided which shifts the timing of read out data of a frame memory for right eye and the timing of read-out data of a frame memory for left eye with respect to each other on the image receiving side so that the observer can freely select a point other than the camera's observation point as his observation point.

Furthermore, according to another aspect of the invention, a stereoscopic television image pickup device is provided in which an electrically controllable aperture and an optical transmission plate having an electrically controllable transmittance are interposed between an object and an image pickup unit for the right eye and a similar aperture and plate are interposed between the object and an image pickup unit for the left eye, and in each image pickup unit, the aperture and the transmittance of the optical transmission plate are controlled so that the video signal level and the degree of opening of the aperture are set to desired values.

The foregoing objects and other objects as well as the characteristic features of the invention will become more apparent from the following detailed description and the appended claims when read in conjunction with the accompanying drawings.

DETAILED DESCRIPTION OF THE PREFERRED EMBODIMENTS

First Embodiment of the Invention

It is assumed that a horizontal scanning line for right eye and a horizontal scanning line for left eye as shown in FIG. 3 are stored in the frame memories 5R and 5L as shown in FIG. 1, respectively. Furthermore, it is assumed for simplification in description that pictures for right and left eyes are made up of one horizontal scanning line HR and one horizontal scanning line HL (describe above), respectively. The pictures made up of the horizontal scanning lines HR and HL are repeatedly read out of the respective frame memories and supplied to the respective picture projecting tubes, as shown in FIG. 1.

The timing of read out data of the frame memories is so adjusted that an object signal P on the horizontal scanning line HL and an object signal p on the horizontal scanning line HR are read out of the respective frame memories 5L and 5R simultaneously. This can be readily achieved by externally adjusting the read timing of the refresh counters 6L and 6R.

Figure 4:
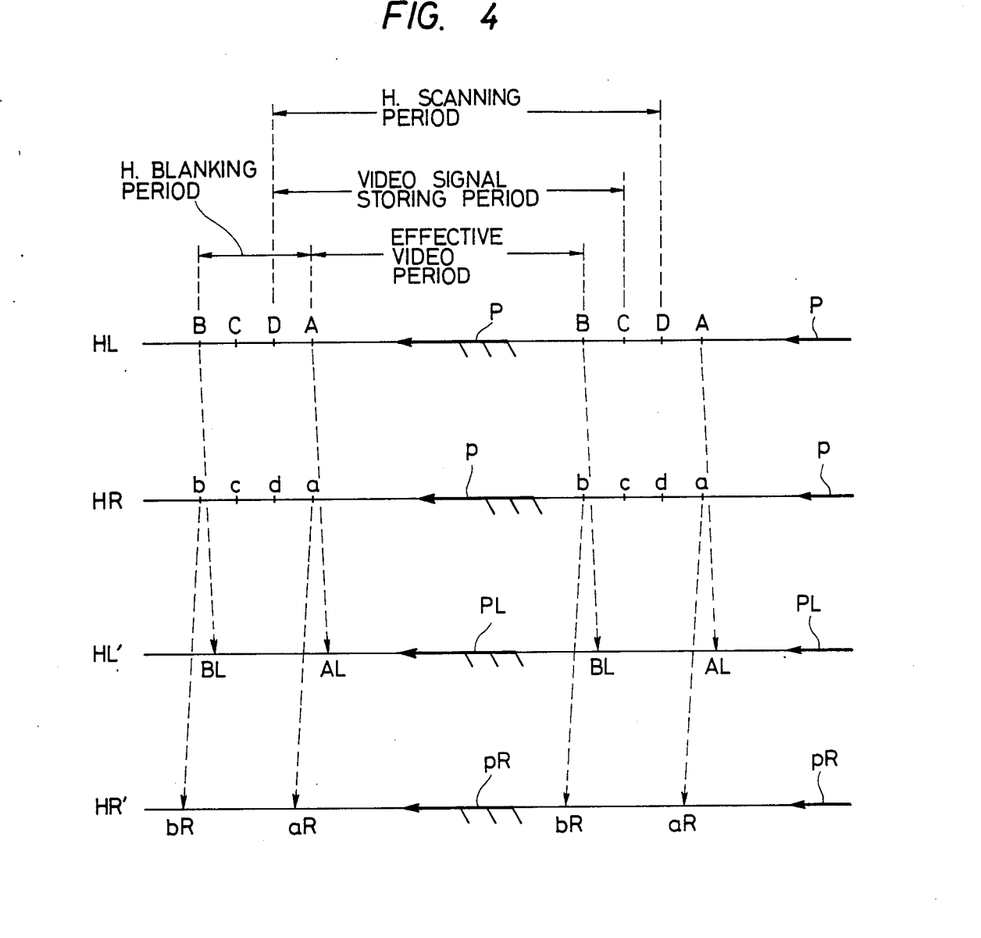
FIG. 4 are diagrams which illustrate the operation of a first embodiment of this invention.

That is, as shown in FIG. 4, the read timing of the horizontal scanning line HL in the frame memory 5L is somewhat delayed so that it is read as a horizontal scanning line HL', while the read timing of the horizontal scanning line HR in the frame memory 5R is somewhat advanced so that it is read as a horizontal scanning line HR'. As a result, an object signal PL on the horizontal scanning line HL' and an object signal PR on the horizontal scanning line HR' are projected on the stereoscopic image displaying screen so as to allow the observer to observe a satisfactory stereoscopic picture.

Since the read timing is shifted as described above, two end points A and B on the horizontal scanning line HL are shifted to the points AL and BL on the horizontal scanning line HL', respectively. Similarly, two end points a and b on the horizontal scanning line HR are shifted to the points aR and bR on the horizontal scanning line HR'. However, in general, the display device performs over-scanning, and therefore even if the read timing is somewhat shifted, both end portions of the displayed picture will not be removed. In the case where the display device does not perform over-scanning or the read timing is excessively shifted with respect to the amount of overscanning, each video signal should be stored in its respective frame memory for a video signal storing period which is slightly longer than the effective picture period as shown in FIG. 4, to prevent the removal of the two end portions of the displayed picture. This can be effected by shortening the blanking period (FIG. 4) and extending the image in the horizontal direction.

Figure 5:
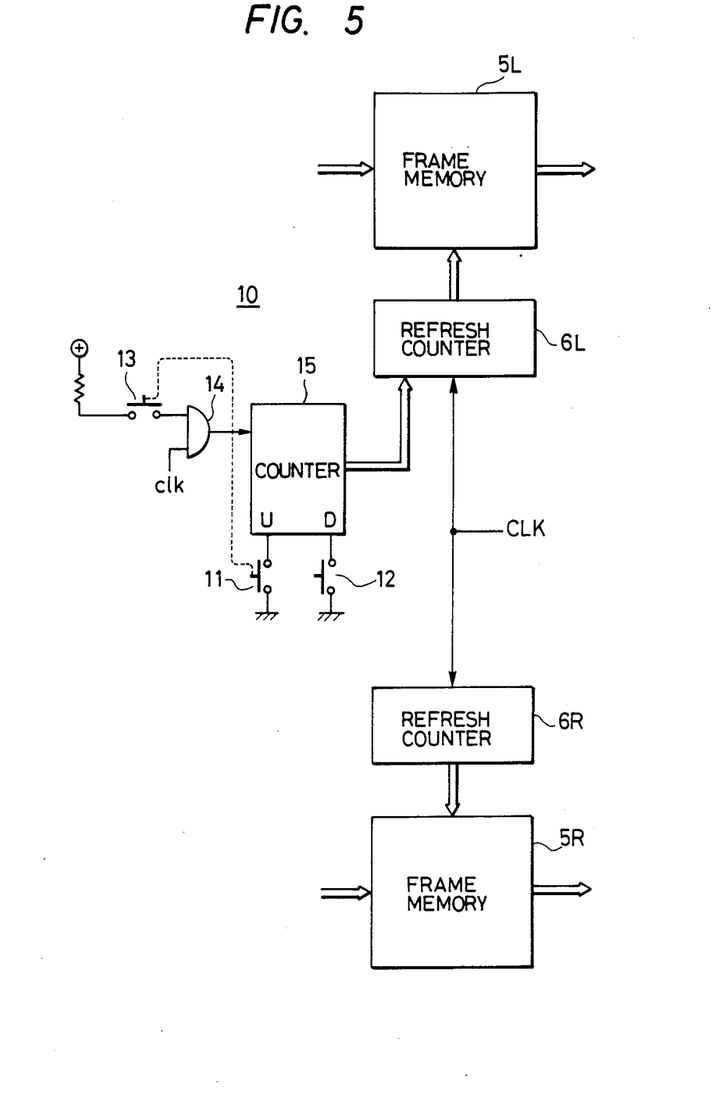
FIG. 5 is a block diagram of a first illustrative embodiment of the invention.

FIG. 5 is a block diagram showing the arrangement of the first embodiment of the invention. In FIG. 5, reference characters 5R and 5L designate a right eye frame memory and a left eye frame memory, respectively; 6R and 6L, a right eye refresh counter and a left eye refresh counter where each of the counters may be a shift register or the like respectively; and 10, a read timing varying circuit.

In the read timing varying circuit 10, when a push button 11 is depressed, a push button 13 is also depressed in association with the operation of the push button 11, as a result of which a low frequency clock signal clk, the number of clock pulses of which is proportional to the push button depression period, is applied through an AND gate 14 to a counter 15. In response to the clock signal thus applied, the counter 15 increases its initial value. The count value of the counter 15 is added to the count value of the refresh counter 6L. As a result, the timing of read out data of the frame memory 5L is advanced with respect to the timing of reading data out of the frame memory 5R.

On the other hand, when the observer (operator) depresses a push button 12 in the read timing varying circuit 10, the push button 13 is depressed in association with the operation of the push button 12, as a result of which a low frequency clock signal clk, the number of clock pulses of which is proportional to the push button depression period, is applied through the AND gate 14 to the counter 15. In response to the clock signal clk thus applied, the counter 15 decreases its initial value. This count-down operation is carried out even to a negative count value. The negative count value of the counter 15 is added to the count value of the refresh counter 6L. As a result, the timing of read out data of the frame memory 5L is delayed with respect to the timing of read out data of the frame memory 5R.

SECOND EMBODIMENT OF THE INVENTION

Figure 5A:
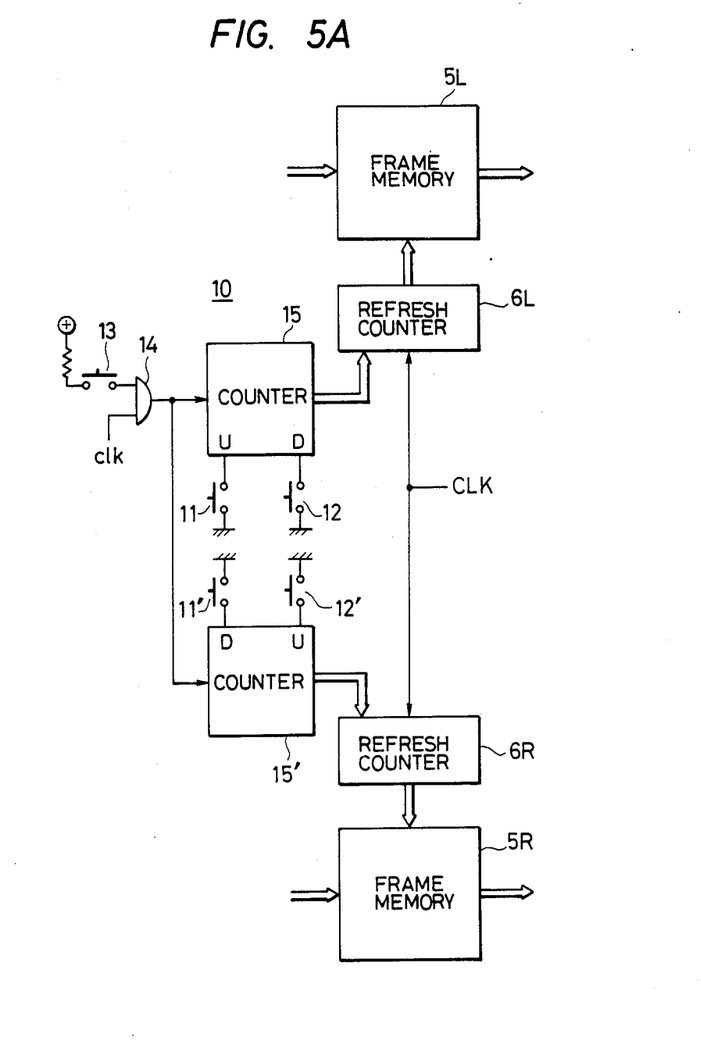
FIG. 5A is a block diagram of a second illustrative embodiment of the invention.

In the above-described embodiment, the timing of read out data of one of the two frame memories is changed. However, it may be so designed that the data reading timings of the two frame memories are shifted in the opposite directions as shown in FIG. 5A. In FIG.

5A, a counter 15' is further employed with respect to the FIG. 5 embodiment and the push button 11 of the counter 15 is ganged with a push button 11' connected to D terminal of the counter 15' and the push button 12 of the counter 15 is ganged with a push button 12' connected to U terminal of the counter 15'. With these connections, read out of data from both of the frame memories can be changed in opposite directions with respect to each other.

As is apparent from the above description, the first and second embodiments of the invention have the read out data of the right eye frame memory and the timing of reading data out of the left eye frame memory shifted with respect to each other. Therefore, the observer can freely select an observation point different from the camera's observation point.

THIRD EMBODIMENT OF THE INVENTION

In a third embodiment of the invention in correspondence to the addition of an optical transmission plate having an electrically controllable transmittance, an aperture is opened to decrease an object depth so that the double images of an object positioned away from a camera's observation point are lowered in visibility, whereby the stereoscopic effect is improved and the difficulty that the resultant picture is made unnatural is eliminated.

Figure 6:
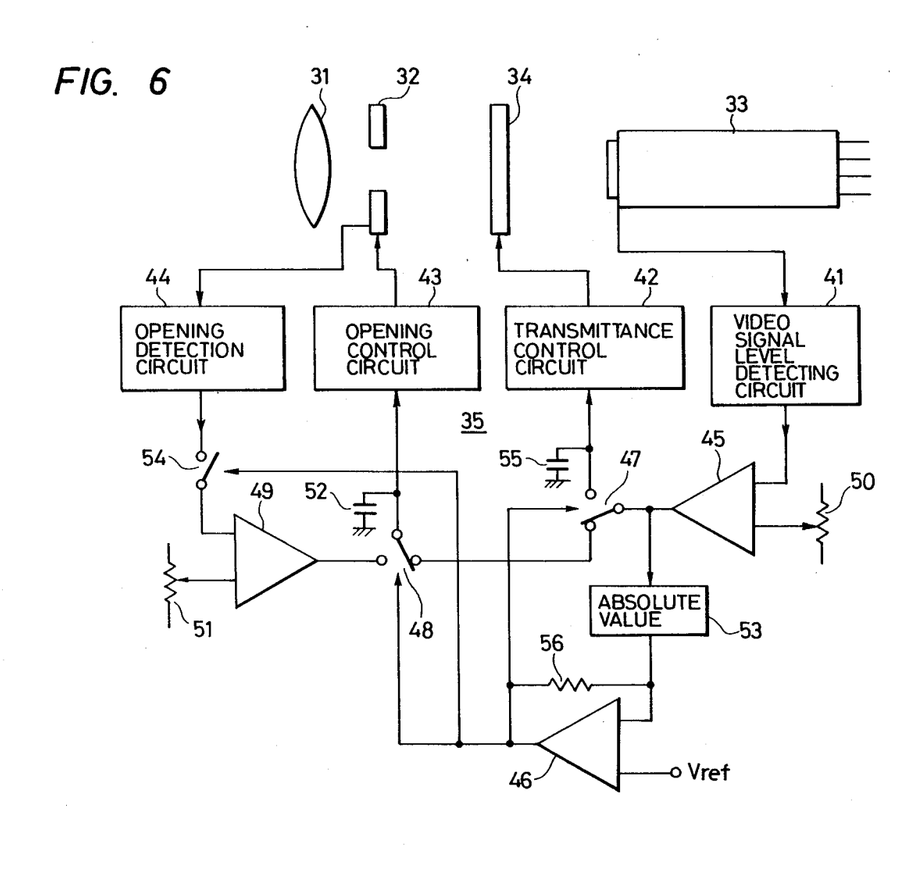
FIG. 6 is a block diagram of a third illustrative embodiment of the invention.

FIG. 6 is a block diagram showing the arrangement of this third embodiment of the invention. In FIG. 6, reference numeral 31 designates a lens; 32, an aperture the degree of opening of which is controlled electrically; 33, an image pickup tube for either the right or left eye although this embodiment may be used with only one of the foregoing cameras; 34, an optical transmission plate the transmittance of which can be electrically controlled; and 35, a control circuit for controlling the aperture 32 and the transmittance of the plate 34.

The optical transmission plate 34 may be made up of an electro-chromic material or liquid crystal whose transmitance changes with voltage applied thereto. Alternatively, a disk whose transmittance is variable in the circumferential direction may be employed in such a manner that it is arranged shifted from the optical axis of the image pickup system and is turned by a servo motor. The optical transmission plate 34 may be replaced by a plurality of ND filters different in transmittance which are selectively used.

The control circuit 35 comprises: a video signal level detecting circuit 41 for detecting the level of a video signal; a transmittance control circuit 42 for controlling the transmittance of the optical transmission plate 34; a degree-of-opening control circuit 43 for controlling the degree of opening of the aperture 32; a level setting circuit 50 for setting a desired level for a video signal; and a degree-of-opening setting circuit 51 for setting a degree of opening for the aperture 32.

When the image pickup device starts its operation, a video signal level detected by the video signal level detecting circuit 41 is applied to a differential amplifier circuit 45. The circuit 45 outputs a difference voltage between the video signal level thus detected and a desired video signal level set by a level setting circuit 50. The difference voltage, after being converted into a non-polarity voltage by an absolute value circuit 53, is compared with a reference voltage Vref in a comparison circuit 46. If, for instance immediately after the operation starts, the absolute value of the difference voltage exceeds the reference voltage Vref, the output of the comparison circuit 4b is raised to a high level, as a result of which the armature of a switch 47 is tripped over to the lower contact in FIG. 6 while the armature of a switch 48 is tripped over to the right contact in FIG. 6.

As a result, the difference voltage outputted by the differential amplifier circuit 45 is applied through the switches 47 and 48 to the degree-of-opening control circuit 43. The latter 43 supplies a degree-of-opening control voltage to the aperture 32 which corresponds to he magntitue and polarity of the difference voltage supplied thereto from the differential amplifier circuit 45. The degree-of-opening control of the aperture 32, corresponding to a general automatic iris operation, is effective to decrease the difference voltage supplied to the degree-of-opening control circuit 43.

When the above-described automatic iris operation is ended, the output of the comparison circuit 46 is set to a low level, the armatures of the switches 47 and 48 are tripped over to the other contacts. At the same time, a switch 54 is closed so that the degree of opening detected by the degree-of-opening detecting circuit 44 is applied to a differential amplifier circuit 49. The differential amplifier circuit 49 outputs a difference voltage between the degree of opening thus detected and a desired degree of opening set by a degree-of-opening setting circuit 51. The difference voltage is applied through the switch 48 to the degree-of-opening control circuit 43 while being buffered by a capacitor 52.

Similarly as in the above-described automatic iris operation, the degree-of-opening control circuit 43 controls the degree of opening of the aperture 32 so that the difference voltage supplied by the differential amplifier 49 is decreased. The desired degree of opening set by the degree-of-opening setting circuit 51 is selected to be a value larger than that which is obtained by the automatic iris operation to decrease the object point depth. Therefore, the aperture 32 is controlled by capacitor 52 so that it opens gradually.

As the aperture 32 opens, the output of the differential amplifier circuit 45 is increased. However, since the low level output of the comparison circuit 46 is partially fed back to the input of circuit 46 through a resistor 56, the output of the comparison circuit 46 is maintained at the low level. Accordingly, the difference voltage of the differential amplifier circuit 45 is supplied to the transmittance control circuit 42. The transmittance control circuit 42 controls the transmittance of the optical transmission plate 34 so that the difference voltage supplied from the differential amplifier circuit 45 is decreased. In practice, because the aperture 32 is gradually opened by capacitor 52 to the desired degree of opening, the transmittance of the plate 34 is controlled so that it is gradually decreased by capacitor 55.

After the aperture 32 has been opened to the desired degree of opening, the degree of opening of the aperture 32 and the transmittance of the plate 34 are controlled by the degree-of-opening detecting circuit 44.

In the above-described embodiment, the aperture 32 which can be electrically controlled and the degree-of-opening setting circuit 51 are used to open the aperture. However, the device may be so designed that an aperture which has a fixed opening is used and the quantity of light is controlled by using the optical transmission plate 34 only. Moreover, according to this method, the aperture may be eliminated if necessary provided optical transmission plate 34 presents an ideal characteristic.

As is apparent from the above description, in the stereoscopic television image pickup device which is the third embodiment of the invention, the aperture of each camera 33 is made open and the object depth is decreased in correspondence to the addition of the optical transmission plate having an electrically controllable transmittance. Therefore, double images of an object located away from the camera's observation point are lowered in visibility; i.e., the resultant picture is scarecely affected by the double images. As a result, the stereoscopic effect at the observation point is remarkably improved, and the difficulty that the resultant picture is made unnatural by the double-image phenomenon is substantially eliminated.

What is claimed is:

1. In a stereoscopic television display device including a frame memory for the right eye which stores a video signal for the right eye; a frame memory for the left eye which stores a video signal for the left eye; and displaying means for displaying said video signals for the right eye and the left eye which are read from said frame memories for the right eye and the left eye; the improvement which comprises:

read-timing varying means disposed at the receiving end of a stereoscopic television system for shifting the timing of read out data of said frame memory for the right eye and the tiing of read out data of said frame memory for the left eye with respect to each other.

2. The improvement as in claim 1 where said read timing varying means includes means for shifting the read out data from only one of said frame memories.

3. The improvement as in claim 1 where said read timing varying means includes means for shifting the read out data from said frame memories in opposite directions with respect to each other.

4. In a stereoscopic television image pickup device comprising an image pickup unit for the right eye which is arranged on the right of an object to form a video signal for the right eye, and an image pickup unit for the left eye which is arranged on the left of said object to form a video signal for the left eye; the improvement which comprises:

a first electrically controllable aperture and a first optical transmission plate having an electrically controllable transmittance which are disposed between the object and said image pickup unit for the right eye and a second electronically controllable aperture and a second optical transmission plate having an electronically controllable transmittance which are disposed between the object and image pickup unit for the left eye; and a control circuit provided for each of said image pickup devices for right eye and left eye, said control circuit adapted to control its associated aperture and the transmittance of its associated optical transmission plate so that a video signal level and the degree of opening of said aperture can be varied.

5. In a stereoscopic image pickup device comprising an image pickup unit for the right eye which is arranged on the right of an object to form a video signal for the right eye, and an image pickup unit for the left eye which is arranged on the left of said object to form a video signal for the left eye; the improvement which comprises:

an aperture and an optical transmission plate having an electronically controllable transmittance which are disposed between the object and at least one of said image pickup units for the right and left eyes; and a control circuit provided for said one image pickup unit, said control circuit being adapted to control the transmittance of said optical transmission plate so that a video signal level can be varied.

6. The improvement as claimed in claim 5 in which said aperture is fixed to a predetermined degree of opening to decrease object depth.

7. The improvement as in claim 5 where said aperture is electronically controllable and said control circuit includes means for controlling the degree of opening of said aperture.

* * * * *